July 18, 1939.  G. H. HAINES  2,166,403
MIXING APPARATUS
Filed Oct. 10, 1938  2 Sheets-Sheet 2
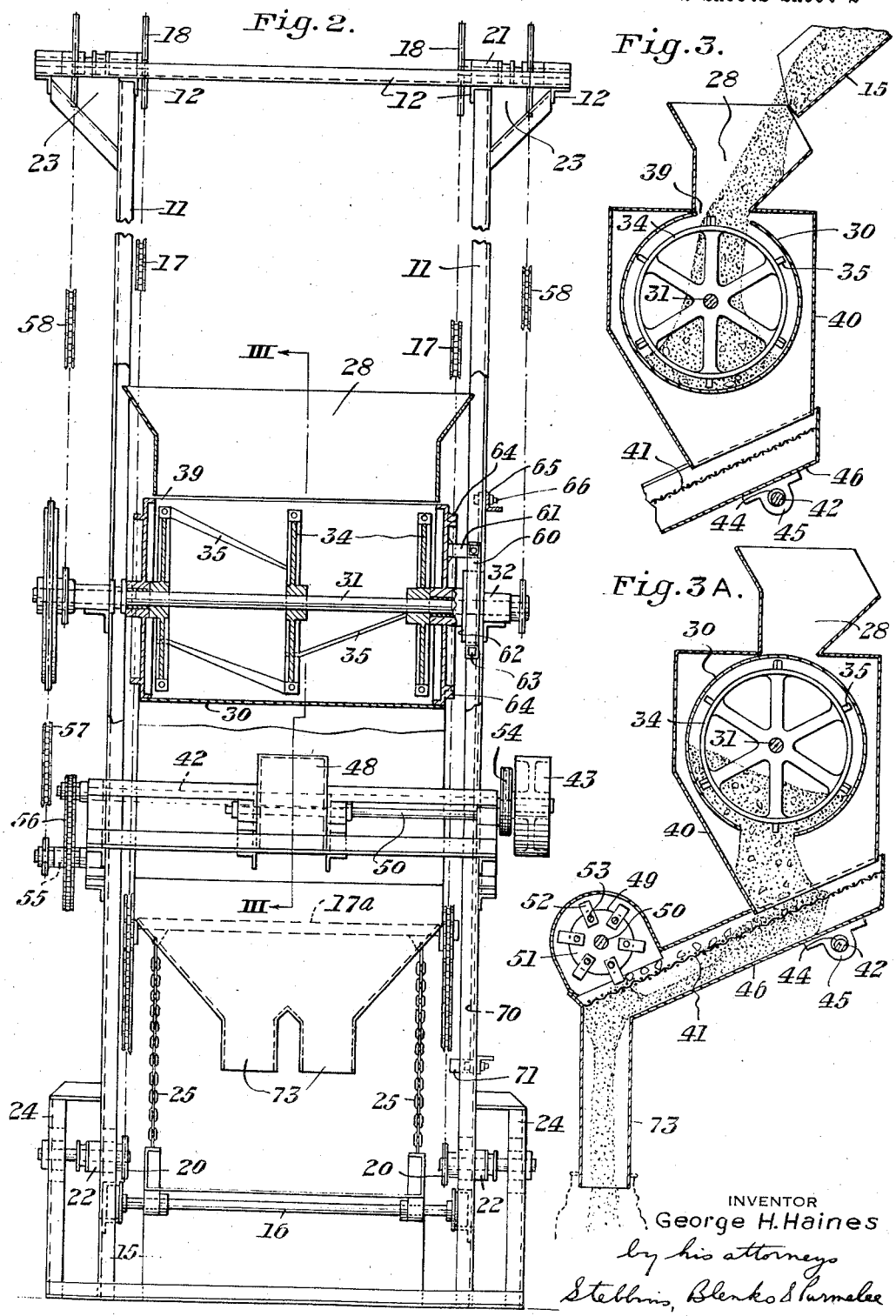
INVENTOR
George H. Haines
by his attorneys
Stebbins, Blenko & Parmelee Patented July 18, 1939

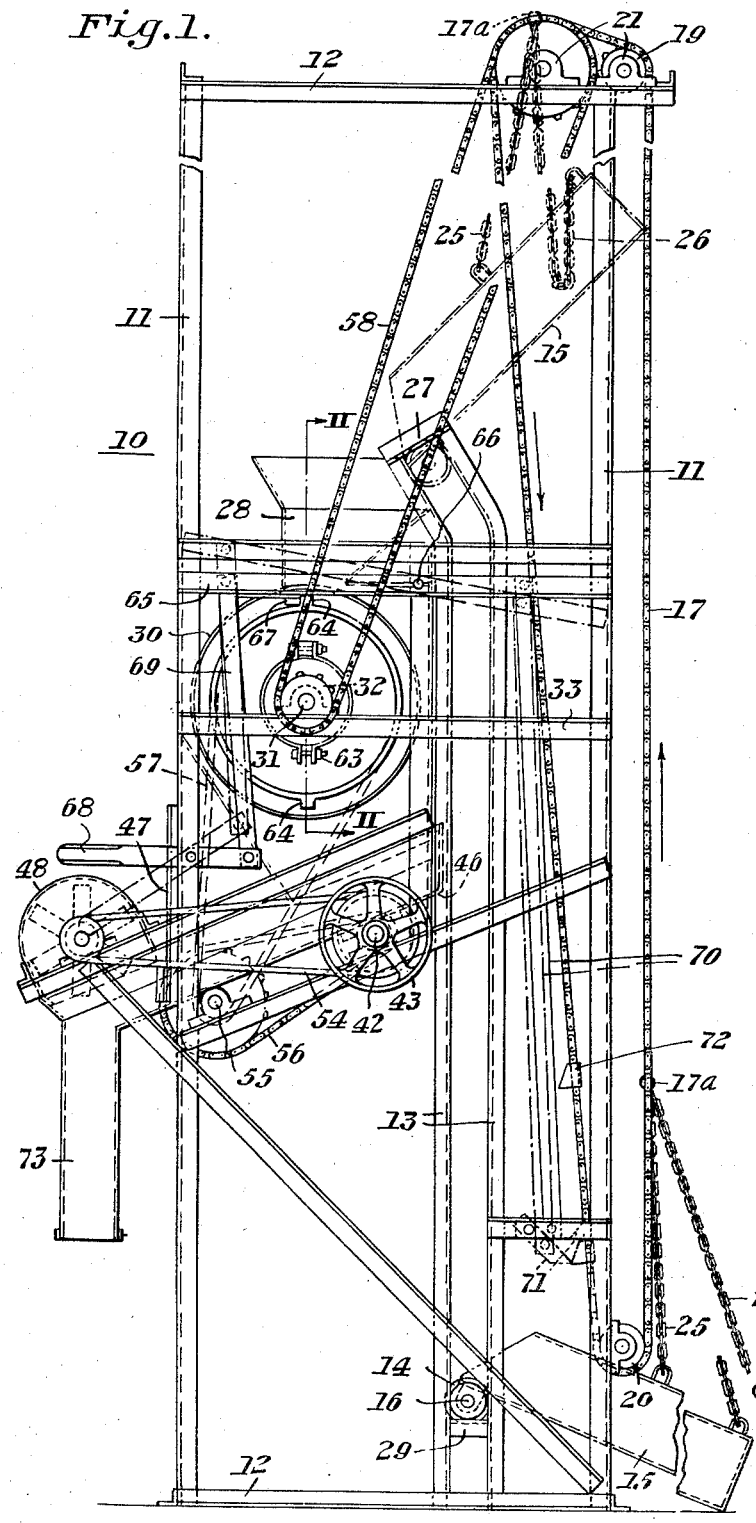

2,166,403

UNITED STATES PATENT OFFICE 2,166,403

MIXING APPARATUS

George H. Haines, Caledonia, Ohio, assignor to The Fairfield Engineering Company, Marion, Ohio, a corporation of Ohio Application October 10, 1938, Serial No. 234,145

3 Claims. (Cl. 259—9)

This invention relates to apparatus for mixing and in particular to an apparatus suitable for mixing dry materials, such as feed, fertilizer, and the like.

Numerous forms of mixing apparatus have been known heretofore, and it is the general object of this invention to improve on such devices by providing an apparatus which is simple in construction and operation and inexpensive to manufacture. A further object is to provide a mixing apparatus which is entirely self-contained and requires only the application of driving power at one point to place it in operation.

In a preferred form, the invention comprises a supporting frame having a mixing chamber mounted thereon. A charging bucket is mounted for movement on the frame from a position in which it may be filled to a position in which it discharges into the mixing chamber. The invention also includes means for periodically operating the charging bucket and for dumping the contents of the mixing chamber after they have been thoroughly mixed therein. Further details of the construction will be explained in the course of the following description by reference to the accompanying drawings.

In the drawings:

Figure 1 is a side elevation;

Figure 2 is a front elevation partly in section on the line II—II of Figure 1;

Figure 3 is a partial sectional view taken along the line III—III of Figure 2; and Figure 3a is a view corresponding to Figure 3 showing the parts at an alternative position.

Referring now in detail to the drawings, a frame 10 comprises suitable vertical members 11 connected by cross members 12. The frame may conveniently be composed of angle bars as illustrated. Guides 13 extend vertically of the frame on opposite sides thereof, providing spaced rails or tracks for the wheels 14 of a charging bucket 15. As shown in Figure 2, the bucket is pivoted to a cross shaft 16 to which the wheels 14 are secured.

Lifting chains 17 are trained around head sprockets 18 and 19, journaled in the frame adjacent the top thereof and foot sprockets 20. The shafts of the several sprockets are journaled in suitable bearings indicated at 21 and 22, the bearings being supported by suitable extensions from the frame as indicated at 23 and 24. To a bar 17a extending between the lifting chains are connected a pair of chains 25 and 26, secured respectively to intermediate and end points of the bucket 15. It will be apparent that when the chains 17 are driven in the direction indicated by the arrows, the bucket 15 will be periodically raised from its lowermost or charging position shown in solid lines in Figures 1 and 2 to the position shown in dotted lines in Figure 1. Because of the relative lengths of the chains 25 and 26, the bucket is maintained in its down-tilted position shown in solid lines as it travels upwardly along the guides 13. As the bucket approaches the upper end of the guides, the wheels 14 engage a stop 27 which prevents further upward movement of the open end thereof. Further movement of the bar 17a to which the chains 25 and 26 are pivotally connected causes the bucket to be up-tilted to the dotted line position, thus dumping the contents thereof into a chute 28 suitably mounted on the frame. After dumping, the bucket is again lowered to the down-tilted position by continued movement of the shaft 17a to which the chains 25 and 26 are pivotally connected and the bucket is finally returned to its initial position. At that point, a stop 29 supports the open end of the bucket, thus maintaining the down-tilted position thereof for recharging.

A mixing chamber 30 in the form of a cylinder with closed ends is rotatably mounted on a cross shaft 31, journaled in bearings 32. The bearings 32 are supported on cross members 33 of the frame 10. Agitating means comprising disks 34 and blades 35 extending therebetween are carried on the shaft 31 inside the chamber 30. The chamber 30 has an opening 39 extending therealong, through which it may be charged, as shown in Figure 3, and discharged, as shown in Figure 3a. The chamber is enclosed in a housing 40 open at the bottom for guiding the material discharged from the chamber onto an oscillating screen 41. A cross shaft 42, journaled in suitable bearings mounted on the frame is provided with a driving pulley 43. As will be explained shortly the shaft 42 serves to drive all the moving parts of the apparatus.

An eccentric 44 on the shaft 42 cooperates with a bearing 45, secured to the bottom pan 46 of the screen 41. The lower end of the screen is resiliently supported on leaf springs 47, secured to the frame. The screen 41 is thus oscillated continually by rotation of the shaft 42.

A pulverizer 48 is mounted above the screen 41 adjacent the lower end thereof and comprises a rotary agitator 49 having a cross shaft 50 journaled in suitable bearings mounted on the frame. On the shaft 50 are mounted disks 51. Hammers 52 are suspended on rods 53 extending through the disks. On rotation of the shaft 50, the hammers are thrown radially outward by centrifugal force and strike against lumps of material descending the screen 41, as shown in Figure 3a, with the result that such lumps are pulverized rapidly until the material composing them is fine enough to pass through the screen.

The shaft 50 is driven by a belt 54 trained around suitable pulleys on the shafts 42 and 50. The stub shaft 55 is driven from shaft 42 by a chain and sprocket drive 56. The shaft 31 is driven from the shaft 55 by a chain and sprocket drive 57. Rotation of the shaft 31 drives the chains 17 through chain and sprocket drives 58. The upper sprockets of the drives 58 are secured to the shafts on which the head sprockets 18 are mounted.

A friction collar 60 secured to a projection 61 extending from one end of the chamber 30 embraces a friction disk 62 secured to the shaft 31. The torque exerted on the chamber 30 through the friction disk and band by the shaft 31 may be controlled by adjusting bolts 63 which hold the halves of the friction band together. Rotation of the shaft 31 thus tends positively to turn the chamber 30 which, as before stated, is rotatable on the shaft 31.

One of the heads of the chamber 30 (the right-hand head in Figure 2) has radial projections 64 formed thereon at two diametrically opposite points, one of the projections being in alignment with the opening 30 in the chamber. A tripping lever 65 is pivoted on the frame at 66 and is provided with a detent 67 adapted to cooperate with the projection 64 for holding the chamber 30 against the tendency of the friction disk and band to rotate it. The chamber is thus held in its charging and mixing position shown in Figure 3 or in the dumping position shown in Figure 3a. The tripping lever 65 may be tilted by a hand lever 68 connected thereto by a link 69. Automatic means for tilting the tripping lever are also provided and include a downwardly extending link 70 connected to a lever 71 pivoted in the frame.

One of the chains 17 (the near chain as viewed in Figure 1) has trip links 72 attached thereto, adapted to cooperate with the lever 71. It will be apparent that engagement of the lever by one of the trip links causes the link 70 to be pulled down, thus tilting the tripping lever 65, as indicated in chain lines. The lever 65 is so counter-balanced that it returns to its initial position after the lever 71 is released by the tripping link. The momentary tilting of the lever 65, however, causes the detent 67 to disengage the projection 64 in contact therewith, permitting the chamber to be turned by the shaft 31 through the friction drive 60, 62. The chamber 30 is arrested by engagement of the detent with the other projection 64 after turning through 180°. The trip links are so positioned on the chain 17 as to cause the chamber 30 to move to the dumping position shown in Figure 3a at a predetermined time after the charging bucket has dumped its contents into the chamber. Similarly, the mixing chamber is restored to the position shown in Figure 3 in time to receive the contents of the charging bucket on its next dumping operation. The chains 17, furthermore, are driven at a speed such that the charging bucket 15 dwells at its lowermost position long enough to permit it to be filled as by dumping the wheelbarrow thereinto. The material discharged into the chamber 30 is thoroughly mixed while it remains therein by the action of the agitator disks 34 and blades 35. When material is dumped from the chamber, as just described, it passes over the screen 41 and lumps are delivered to the pulverizer 48 by which they are reduced to a state fine enough to pass through the screen. The screened material flows downwardly into bagging chutes 73 and is there collected into bags or other suitable containers.

In addition to the automatic operation of the chamber 30 by the links 72, it may also be caused to shift by operating the hand lever 68. It will be understood, of course, that the lever 68 is merely pulled down and then released so that the detent 67 thereon will engage one of the projections 64 on the head of the mixing chamber the next time it comes around.

It will be apparent that the invention provides a mixing apparatus having numerous advantages and desirable features. The operation is entirely automatic except for the filling of the charging bucket and the bagging of the mixed material. Only a single source of power is required and the apparatus may be shipped assembled so it can be operated immediately on setting up, merely by driving the single pulley 43. The power requirement, furthermore, is small and substantially uniform. This is the case because the mixing chamber is empty when the charging bucket is being raised. Conversely during the mixing operation, the empty bucket is lowered.

The capacity of the device is high because of its automatic operation and the elimination of manual operation of the valves usually embodied in mixing apparatus.

Although I have illustrated and described herein but a preferred form of the invention, it will be understood that changes in the construction and operation disclosed may be made without departing from the spirit of the invention or the scope of the appended claims.

I claim:

1. Mixing apparatus comprising a frame, a mixing chamber mounted thereon and movable from a loading position to a dumping position, a charging bucket movable in said frame from a loading position to a dumping position, an endless traction member traversing said frame, said bucket being secured to said member for periodic operation thereby from its loading position to its dumping position and return, and means controlled by said member for holding said chamber in its loading and dumping positions.

2. Mixing apparatus comprising a frame, a mixing chamber mounted therein for movement from charging to dumping position, a charging bucket mounted for substantially vertical movement relative to said chamber from charging to dumping position, an endless traction member traversing said frame, said bucket being secured thereto for periodic movement from one of its positions to another, and means actuated by said member for causing movement of said chamber from one of its positions to another in timed relation to the movement of said bucket.

3. Mixing apparatus comprising a frame, a mixing chamber mounted therein having an opening for charging and discharging, means mounting said chamber for movement of said opening from charging to dumping position and return, means normally tending to effect such movement, means normally holding said chamber against such movement, an elevator for charging said chamber, means for operating said elevator periodically, and means actuated in predetermined time relation with operation of said elevator for releasing said holding means.

GEORGE H. HAINES.